Aug. 14, 1923.

S. J. MISENER 1,464,953

SLUICING MECHANISM FOR FILTER PRESSES

Filed June 20, 1921     3 Sheets-Sheet 2

INVENTOR
SAMPSON J. MISENER

BY *Fetherstonhaugh & Co*

ATT'YS.

Aug. 14, 1923.
S. J. MISENER
1,464,953
SLUICING MECHANISM FOR FILTER PRESSES
Filed June 20, 1921   3 Sheets-Sheet 3
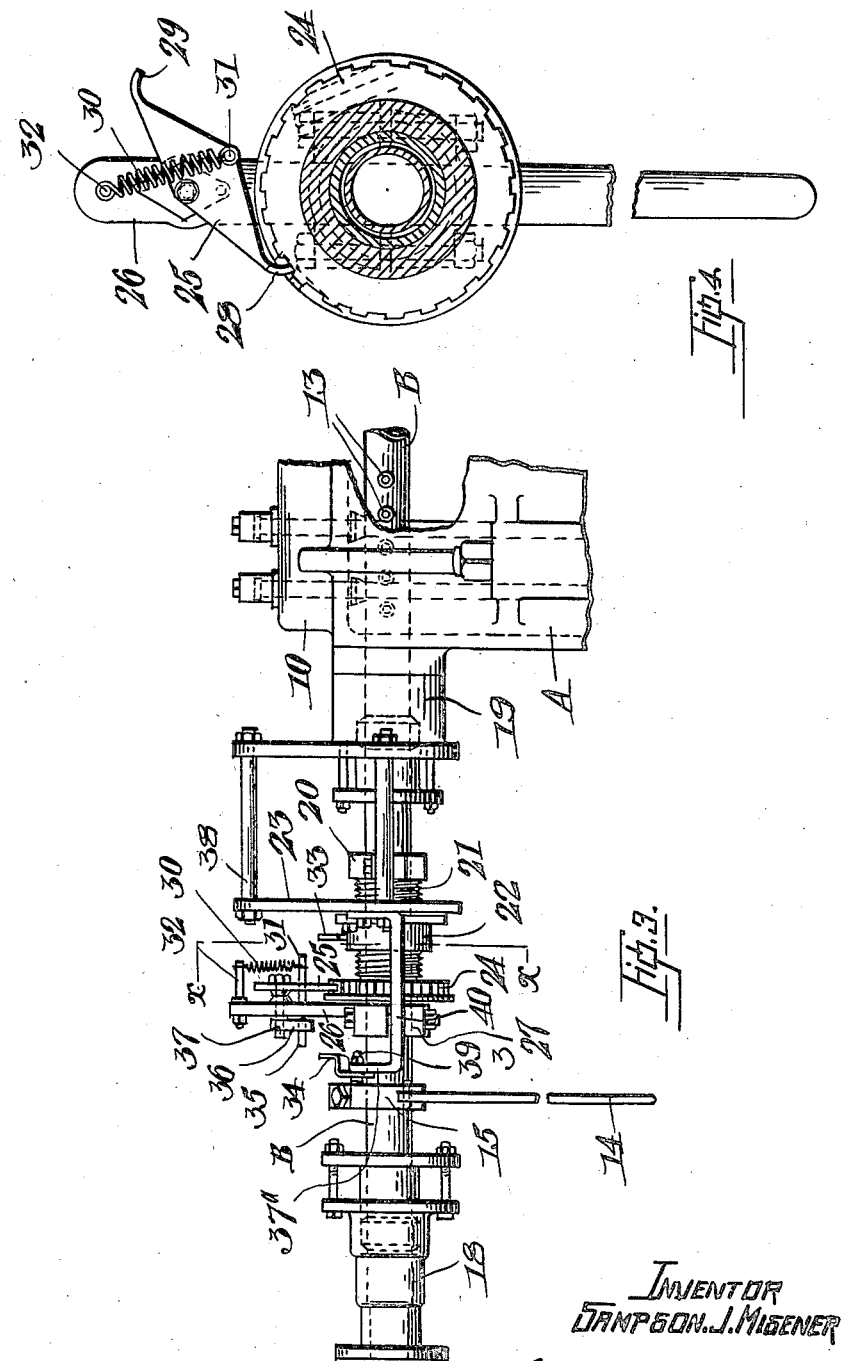

Patented Aug. 14, 1923.

1,464,953

UNITED STATES PATENT OFFICE.

SAMPSON JOHN MISENER, OF WOODSIDE, NOVA SCOTIA, CANADA.

SLUICING MECHANISM FOR FILTER PRESSES.

Application filed June 20, 1921. Serial No. 479,046.

*To all whom it may concern:*

Be it known that I, SAMPSON JOHN MISE-NER, a subject of the King of Great Britain, and residing at Woodside, town of Dartmouth, in the Province of Nova Scotia and Dominion of Canada, have invented certain new and useful Improvements in Sluicing Mechanism for Filter Presses, of which the following is a specification.

This invention relates to improvements in sluicing mechanism for filter presses, particularly to the mechanism of that type of press termed Sweetland filter, and in which the cake is removed from the filter cloth by a longitudinally movable and oscillating wash water pipe extending into the filter casing and having discharge nozzles from which the wash water stream discharges against the face of the filter cloth.

In this type of press, different mechanism have been constructed for reciprocating and oscillating the wash water pipe, and the present invention relates to an improved type of such mechanism which will be of simple construction and cheaper to build, and having the moving parts open to inspection.

Further objects of the invention are generally to improve and simplify the construction of the mechanism to better adapt the various parts to perform the functions required of them.

It consists essentially of the improved construction hereinafter described in detail in the accompanying specification and drawings.

In the drawings:

Figure 3 is an elevation.

Figure 4 is an enlarged sectional detail on the line *x—x*, Figure 3.

Figure 5 is an elevation on a reduced scale of the oscillating mechanism.

In the drawings, like characters of reference indicate corresponding parts in all the figures.

Figure 1:
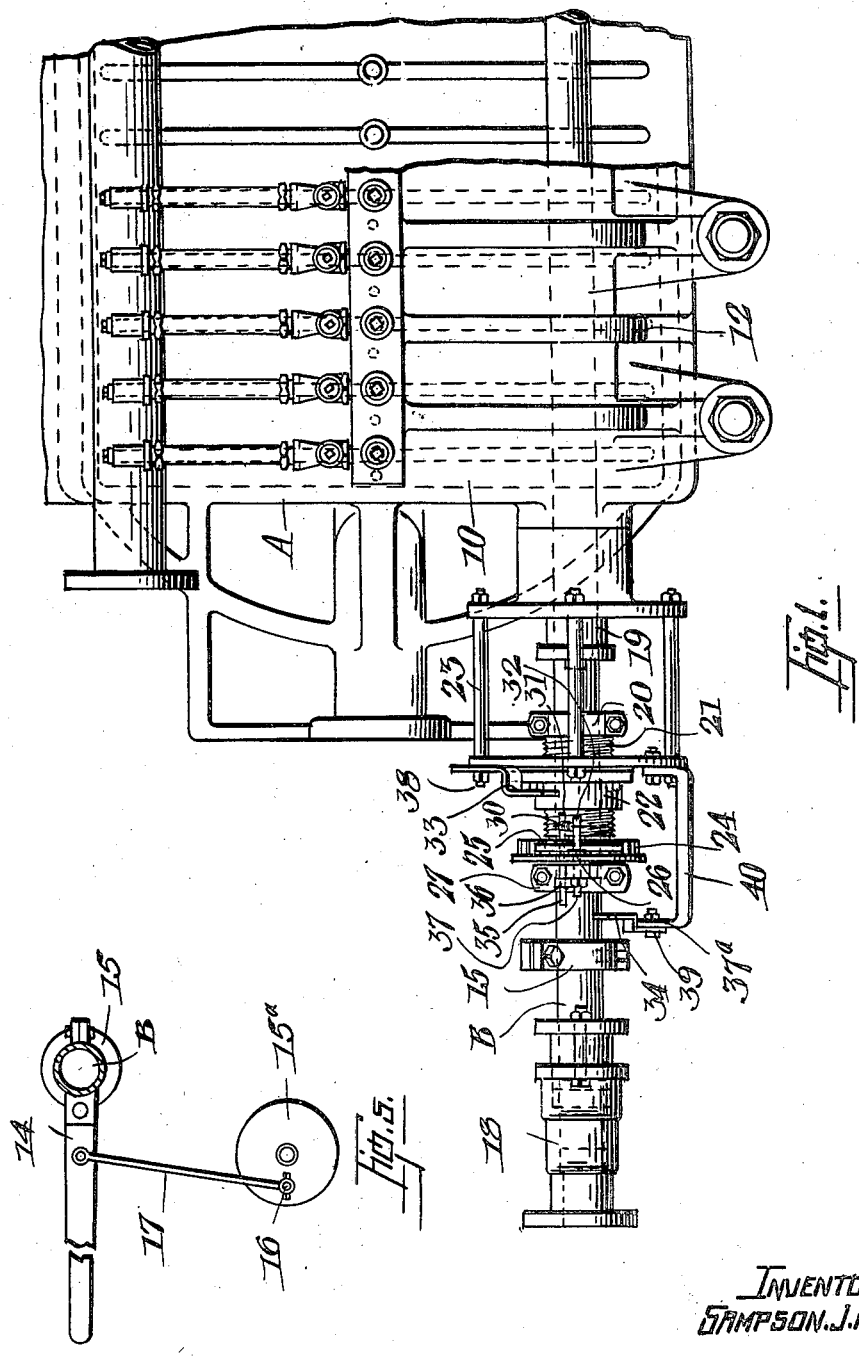
Figure 1 is a plan view of the mechanism and a portion of a Sweetland filter.
Figure 2:
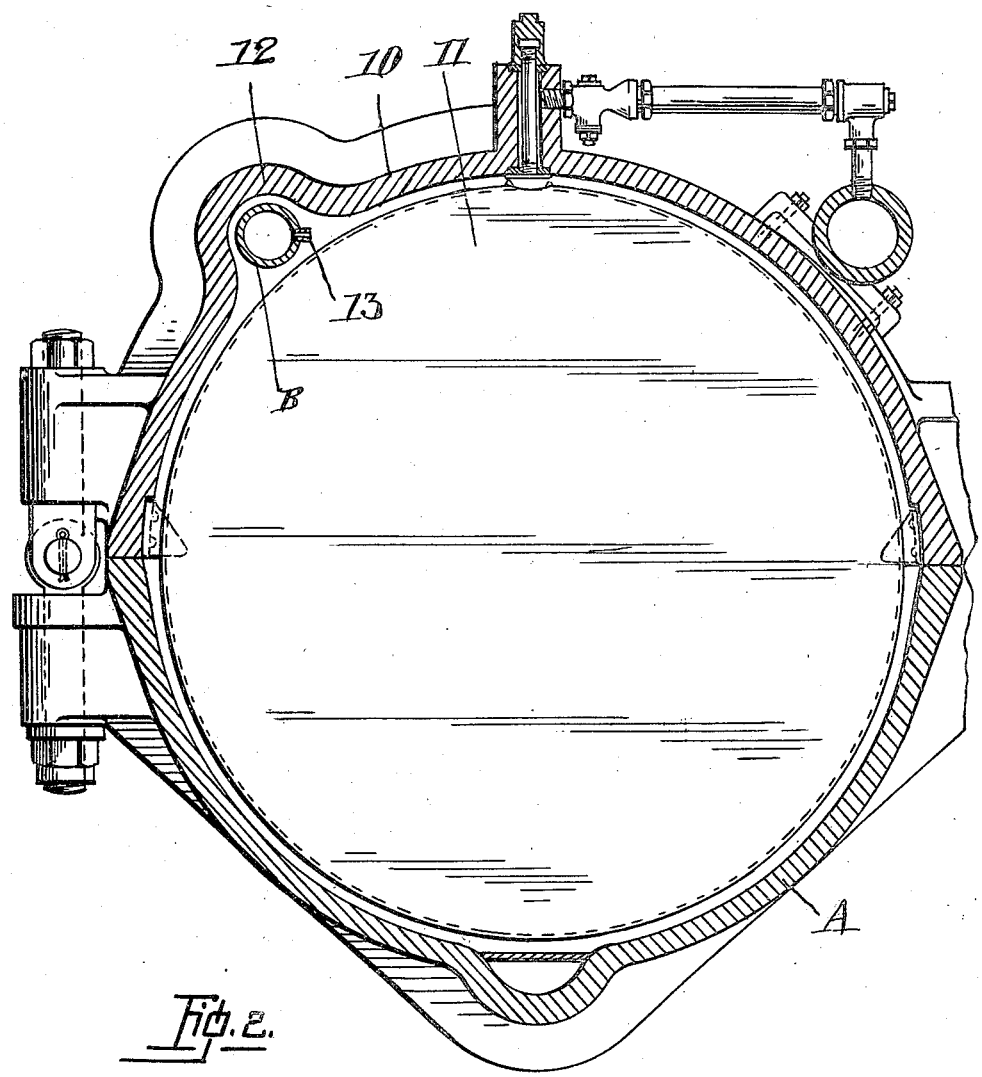
Figure 2 is a cross-sectional view through the filter press.

Referring to the drawings:

A indicates the filter press having a casing 10 which contains the filter cloth 11 and which is formed on one side near the top with a recess 12 in which extends a horizontally disposed wash water pipe B. This pipe extends longitudinally through the casing and is formed at intervals with discharge nozzles 13 through which the wash water is discharged against the filter cloth, the nozzles being spaced apart a distance substantially equal to the distance between adjacent filter cloths.

The manner of constructing and supporting the filter cloth and the construction of the filter press itself does not form part of the present invention and, being well known in the art, will not be herein described further in detail.

The mechanism for oscillating the wash water pipe B comprises a lever 14 rigidly connected to a split collar 15 which is clamped to the wash water pipe B, the said pipe being oscillated angularly through approximately ninety degrees (90°). By oscillation of the lever 14, the oscillation of this invention may be caused to take place through any suitable mechanism or manually. I have shown in Figure 5 suitable mechanism for accomplishing this purpose comprising a rotary disc 15$^a$ having a pin 16 on its periphery connected by a link 17 with the end of the lever 14.

The wash water pipe B is supported with freedom to turn and oscillate in suitable bearings 18 and 19, the bearing 19 being in the nature of a stuffing box adapted to prevent escape of water from the casing 10. The wash water pipe is provided at one point with a split collar 20 which is rigidly clamped thereto and adapted to form an abutment for a threaded sleeve or screw 21 which is loosely mounted on the wash water pipe and engaged by a stationary nut or sleeve 22 supported from a bracket 23 connected to the casing 10.

Movement is adapted to be imparted to the screw 21 by means of a pawl wheel 24 connected thereto and designed to be engaged by a double-ended pawl 25 mounted on an arm 26 rigidly connected at one end to the wash water pipe B by means of a split clamping collar 27. The pawl 25 is centrally pivoted and has teeth 28 and 29 at opposite ends adapted alternatively to be brought into engagement with the teeth of the pawl wheel, the pawl being held in one or other of its engaging positions by gravity or spring means; the means I have illustrated comprising a spring 30 extending from the pin 31 on the pawl 25 to a pin 32 on the arm 26, the tension of the spring being adapted to be exerted alternatively on opposite sides of the pivotal point of the pawl whereby it will serve to maintain the pawl in spring engagement with either the tooth 28 or to the tooth 29 in engagement with the pawl wheel.

The pawl is designed to be shifted from one alternative position to the other when the limited movement in either direction is reached; the means I have shown to accomplish this purpose comprising an adjustable stop 33 at one end adapted to engage the pin 31 and an adjustable stop 34 at the opposite end designed to engage a pin 35 carried on a crank 36 connected to the pin 37 on which the pawl 25 is pivotally mounted. The stop member 33 is adjustably connected by a bolt 38 to the bracket 23 while the stop member 34 is adjustably connected by a bolt 39 to a U-shaped extension arm 37ª connected to the bracket 40. The stops 33 and 34 are so disposed that when the pawling arm 26 is oscillated, the pins 31 and 35 will be engaged by the corresponding stops and the position of the pawl reversed.

In the operation of the invention water is pumped into the open end of the sluicing pipe B through a bearing 18 which also acts as a stuffing box and is discharged continuously through the nozzle 13. The lever 14 is oscillated through an angle of approximately ninety degrees (90°) and in so doing the pawl arm 26 will operate the pawl 25, turning the pawl wheel 24 which will turn the screw 21 which engaging the fixed nut 22 will exert a pressure against the collar 20 which will move the wash water pipe B ahead in an axial direction. The return stroke of the lever 14 is an idle one. Successive strokes of the lever 14 will push the wash water pipe ahead until the pin 31 engages the stop 33, reversing the position of the pawl 25 whereupon successive strokes of the lever will then unscrew the screw 21 and move the wash water pipe in a reversed direction until the stop 34 engages the pins 35, the screw in its reverse movement bearing against the collar 27. The distance of lateral travel of the wash water pipe may be adjusted by adjusting or changing the stops 33 and 34.

It will be seen that by the mechanism the wash water pipe is reciprocated axially while it is being oscillated and, in this way, the stream of wash water effectually cleans the filter leaf. Each nozzle is designed to travel from the centre of one filter leaf to the centre of the next one and, during this travel, will wash off the dirt from either side of the filter leaf, the oscillation of the nozzle causing it to spray the dirt off of the full area of the filter leaf.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a mechanism of the character described and in combination, a wash water pipe, means for oscillating the same, a screw loosely mounted on the wash water pipe, means for causing the wash water pipe to move axially with the screw, a fixed nut engaging the screw, a pawl wheel connected to the screw, a pawl cooperating with the pawl wheel and a pawl arm supporting the pawl and connected to the wash water pipe.

2. The mechanism as claimed in claim 1, in which the pawl is reversible and in which means are provided for reversing the position of the pawl after the wash water pipe has moved a determined distance in either direction.

3. The mechanism as claimed in claim 1, in which the pawl is centrally pivoted and provided with teeth at opposite ends adapted to engage the pawl wheel and adapted to be yieldably held with either tooth engaged with the pawl wheel, and stop members adapted to reverse the position of the pawl.

In witness whereof I have hereunto set my hand in the presence of two witnesses.

SAMPSON JOHN MISENER.

Witnesses:
E. N. GUNSAULUS, Jr.,
MARIE DUDDY.